United States Patent [19]

Dreier

[11] 4,381,024
[45] Apr. 26, 1983

[54] HACK SAW

[76] Inventor: Raymond C. Dreier, 1115 Industrial Ave., Escondido, Calif. 92025

[21] Appl. No.: 334,646

[22] Filed: Dec. 28, 1981

[51] Int. Cl.³ .............................................. B27B 21/02
[52] U.S. Cl. ................................ 145/33 R; 145/32 R; 145/33 A
[58] Field of Search ................. 145/33 R, 33 A, 32 R

[56] References Cited

U.S. PATENT DOCUMENTS

| 2,796,098 | 6/1957 | Dreier | 145/33 |
| 2,808,086 | 10/1957 | Dreier | 145/33 |
| 4,287,922 | 9/1981 | Nelson | 145/32 R |

FOREIGN PATENT DOCUMENTS

| 889673 | 1/1972 | Canada | 145/32 R |
| 499630 | 11/1919 | France | 145/32 R |

Primary Examiner—Stephen G. Kunin
Assistant Examiner—J. T. Zatarga

[57] ABSTRACT

An improved hack saw in which a compression tube together with two parallel adjustable tension rods comprise the main horizontal frame assembly. The compression tube having an inside vertical dimension several times greater than the diameter of the tension rod is held in place by bosses extending from the front side of the handle and the rear side of the blade support arm. One compression rod is located above and parallel to the compression tube. The second rod is positioned inside and at the lower vertical extremity of the compression tube. Tension applied to the rods by means of threaded nuts on the front of the blade support arm applies compression to the compression tube resulting in a frame assembly highly resistant to bending moments and distortion.

2 Claims, 5 Drawing Figures

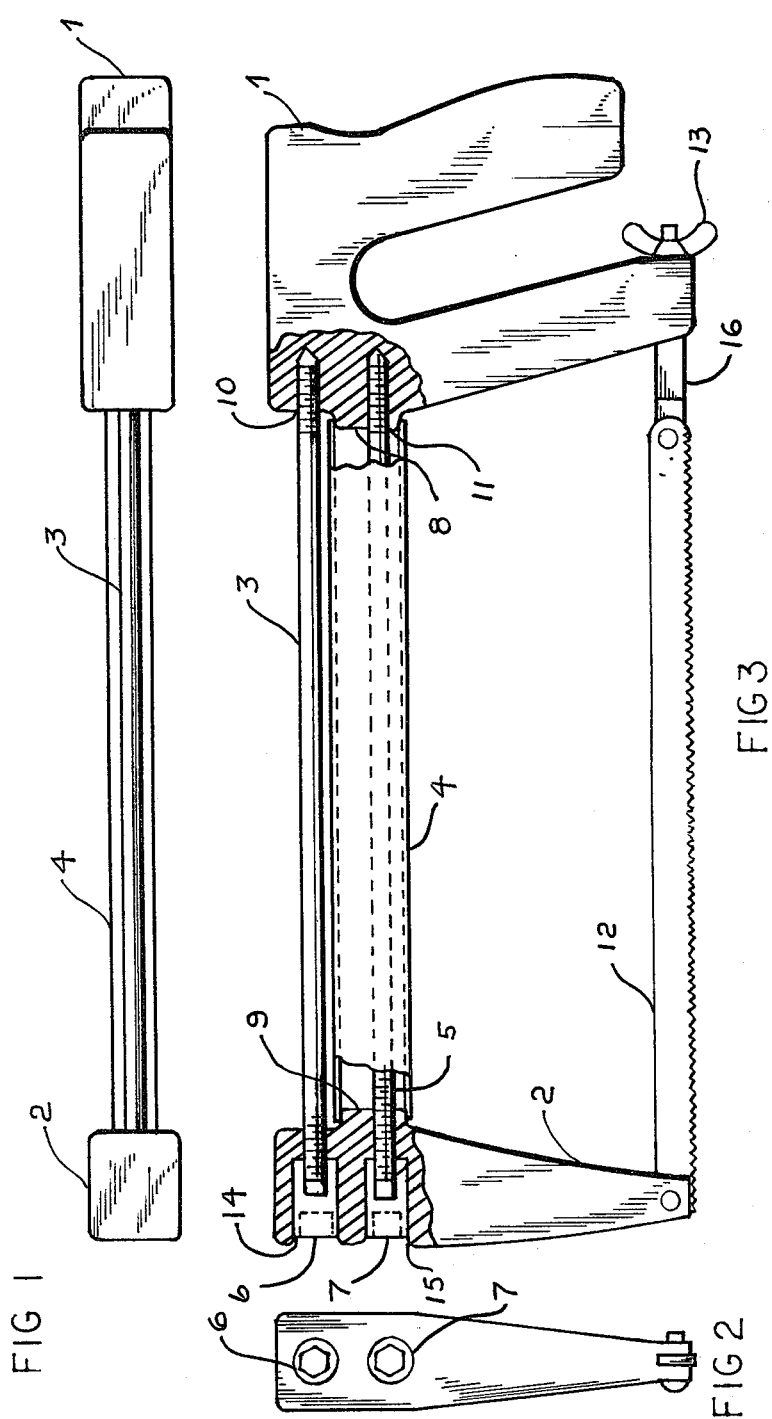

HACK SAW

BACKGROUND OF THE INVENTION

This invention relates to hand saws and more particularly to the type commonly referred to as hack saws.

Known hack saws of the type considered here have a common design problem relating to bending moments transmitted to the saw blade when tension is applied to the ends of the blade and when the blade is loaded in the cutting mode. Recognition of this fundamental problem is illustrated by the multitude of solutions suggested by those skilled in the art.

Hack saws are traditionally, and almost universally, made having a longtitudinal frame member normally horizontal with vertical downward members at each end. The bottom extremities of the vertical members having means for fastening and applying tension to the saw blade between the two members. Most usually one of the vertical members serves as the saw handle, the other as a blade support arm.

There have been a number of hack saw designs which use a combination of tension and compression members in the frame assembly. The following U.S. Patents disclose such designs:

U.S. Pat. No. 2,796,098
U.S. Pat. No. 2,808,086

The primary objective of this invention is to provide a frame assembly relatively free from bending moments or distortion in the plane of the plane common to the horizontal members and the front and rear vertical members.

SUMMARY OF THE INVENTION

The hack saw of the present invention resolves the above stated design problem in existing hack saws by providing a main horizontal compression tube loaded in tension between the front and rear vertical members by two tension rods, one above the compression tube and the second within the compression tube. The resultant of these forces provides a main longitudinal saw frame that is highly resistant to bending in the plane of the saw blade when tension is applied to the blade.

BRIEF DESCRIPTION OF THE DRAWINGS

FIG. 1 is a top view of the hack saw as shown in FIG. 3.

FIG. 2 is a view looking at the front end of the hack saw as shown in FIG. 3.

FIG. 3 is a view in side elevation illustrating the hack saw from embodying the invention.

FIG. 4 is a view looking at the handle end of the hack saw as shown in FIG. 3.

DESCRIPTION OF THE PREFERRED EMBODIMENT

Referring to FIG. 3 the hack saw frame herein illustrated comprises a main horizontal frame assembly the front end being attached to a blade support arm 2 and the back end attached to a handle 1. The main frame assembly consisting of a compression tube 4 and the tension rods 3 and 5. The tension rods threaded at each end are threadably attached to the handle by threaded holes 10 and 11. The tension rods are threadably attached to the blade support arm by nuts 6 and 7 in the counterbored holes 14 and 15. The compression tube 4 is positioned by means of the boss 8 in the handle and boss 9 on the blade support arm. The tension rod 5 is positioned in the lower portion of the compression tube which has an inside vertical dimension several times greater than the diameter of the tension rod. The saw blade 12 is fastened between the front support arm and the handle with a tensioning bar 16 and the tension application wing nut 13.

From the foregoing construction the operation of the combination of tension rods 3 and 5 and the compression tube 4 will be readily understood. With the compression tube in place between the internal bosses 8 and 9 approximately equal tension is applied to the tension rods 3 and 5. The resulting loaded frame assembly effectively resisting any tendency of the frame to bend or distort as tension is applied to the saw blade by the wing nut 13 or loads applied to the saw blade when used in the cutting mode.

What is claimed is:

1. An improved hack saw of the type having a frame consisting of a longitudinal, normally horizontal, member having downwardly extending members at each end supporting a saw blade between their lower extremities, one end member being the saw handle, means for applying tension to the saw blade between the two members wherein the improvement comprises:
    a. a compression tube positioned between the upper portion of the downwardly extending members;
    b. a first rod adjustable in tension between the downwardly extending members positioned above the compression tube; and
    c. a second rod adjustable in tension between the downwardly extending members positioned inside the compression tube;

2. In a hack saw as described in claim 1, wherein:
    a. the tension rods are threaded at each end;
    b. the saw handle having threaded holes for securing the tension rods;
    c. a front member having counterborded holes in the front surface for securing the tension rods;
    d. threaded nuts in the counterbored holes for applying tension to the rods;
    e. a boss extending from the front of the handle closely fitted the inside dimensions of the compression tube; and
    f. a boss extending from the rear of the front member closely fitting the inside dimensions of the compression tube.

* * * * *